US005946352A

United States Patent [19]
Rowlands et al.

[11] Patent Number: 5,946,352
[45] Date of Patent: Aug. 31, 1999

[54] METHOD AND APPARATUS FOR DOWNMIXING DECODED DATA STREAMS IN THE FREQUENCY DOMAIN PRIOR TO CONVERSION TO THE TIME DOMAIN

[75] Inventors: Jonathan Rowlands, Dallas; Stephen (Hsiao Yi) Li, Garland; Frank L. Laczko, Sr., Allen; Maria B.H. Gill, Plano; David (Shiu W.) Kam; Dong-Seok Youm, both of Richardson, all of Tex.

[73] Assignee: Texas Instruments Incorporated, Dallas, Tex.

[21] Appl. No.: 08/851,575

[22] Filed: May 2, 1997

[51] Int. Cl.[6] .............................. H04B 14/04; H04B 1/66; H04B 3/00

[52] U.S. Cl. ............................ 375/242; 375/241; 341/50; 341/55; 381/77; 381/80; 704/500; 704/501

[58] Field of Search .................................... 375/242, 241; 341/50, 55; 370/537, 538, 540, 541; 381/77, 80; 704/500, 501, 503, 504

[56] References Cited

U.S. PATENT DOCUMENTS

| | | | |
|---|---|---|---|
| 5,488,665 | 1/1996 | Johnston et al. | 381/2 |
| 5,636,186 | 6/1997 | Yamamoto et al. | 369/4 |
| 5,644,310 | 7/1997 | Laczko, Sr. et al. | 341/143 |
| 5,657,423 | 8/1997 | Benbassat et al. | 395/2.39 |
| 5,729,556 | 3/1998 | Benbassat et al. | 371/31 |
| 5,748,835 | 5/1998 | Lee | 386/104 |
| 5,867,819 | 2/1999 | Fukuchi et al. | 704/500 |

OTHER PUBLICATIONS

Bergher et al., Dolby AC–3 and MPEG–2 Audio Decoder IC with 6–Channels Output, IEEE Transactions on Consumer Electronics, pp. 567–574, Aug. 1997.

Okabe et al., Full Audio Software Solution For a 16–Bit DSP Core For Digital Audio Decoder LSI, IEEE Transactions on Consumer Electronics, pp. 117–124, Feb. 1998.

MPEG–1, 3–11172.

MPEG–2, *Information Technology*—Generic Coding of Moving Pictures and Audio : Audio ISO/IEC 13818–3, 2nd .

*Digital Audio Compression Standard (AC–3)*, Dec. 20, 1995, Advanced Television Systems Committee, ATSC Standard.

TI–17424A (S.N. 08/475,251), allowed, *Integrated Audio Decoder System and Method of Operation.*

TI–17600 (S.N. 08/054,127), allowed, *System Decoder Circuit With Temporary Bit Storage and Method of Operation.*

*Primary Examiner*—Stephen Chin
*Assistant Examiner*—Michael W. Maddox
*Attorney, Agent, or Firm*—Gerald E. Laws; Robert D. Marshall, Jr.; Richard L. Donaldson

[57] ABSTRACT

A data processing device is programmed to decode and transform a stream of data representing a plurality of sub-band encoded channels of audio data into one or more channels of PCM encoded data for reproduction by a speaker subsystem. An improved method for decoding and transforming utilizes downmix matrices (1021 and 1022) to form downmixed frequency domain channels in buffers (1031–1034). Only two long DCT transform operations (1041 and 1042) and two short DCT transform operations (1043 and 1044) are needed to transform the downmixed frequency domain channels into a left PCM output (1071) and a right PCM output (1072).

12 Claims, 10 Drawing Sheets

METHOD AND APPARATUS FOR DOWNMIXING DECODED DATA STREAMS IN THE FREQUENCY DOMAIN PRIOR TO CONVERSION TO THE TIME DOMAIN

FIELD OF THE INVENTION

This invention relates in general to the field of electronic systems and more particularly to an improved modular audio data processing architecture and method of operation.

BACKGROUND OF THE INVENTION

Audio and video data compression for digital transmission of information will soon be used in large scale transmission systems for television and radio broadcasts as well as for encoding and playback of audio and video from such media as digital compact cassette and minidisc.

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG standard has gained wide acceptance in satellite broadcasting, CD-ROM publishing, and DAB. The MPEG Standard is useful in a variety of products including digital compact cassette decoders and encoders, and minidisc decoders and encoders, for example. In addition, other audio standards, such as the Dolby AC-3 standard, involve the encoding and decoding of audio and video data transmitted in digital format.

The AC-3 standard has been adopted for use on laser disc, digital video disk (DVD), the US ATV system, and some emerging digital cable systems. The two standards potentially have a large overlap of application areas.

Both of the standards are capable of carrying up to five full channels plus one bass channel, referred to as "5.1 channels," of audio data and incorporate a number of variants including sampling frequencies, bit rates, speaker configurations, and a variety of control features. However, the standards differ in their bit allocation algorithms, transform length, control feature sets, and syntax formats.

Both of the compression standards are based on psychoacoustics of the human perception system. The input digital audio signals are split into frequency subbands using an analysis filter bank. The subband filter outputs are then downsampled and quantized using dynamic bit allocation in such a way that the quantization noise is masked by the sound and remains imperceptible. These quantized and coded samples are then packed into audio frames that conform to the respective standard's formatting requirements. For a 5.1 channel system, high quality audio can be obtained for compression ratio in the range of 10:1.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications.

An object of the present invention is provide an improved apparatus and methods of processing MPEG, AC-3 or other streams of data.

Other objects and advantages will be apparent to those of ordinary skill in the art having reference to the following figures and specification.

SUMMARY OF THE INVENTION

In general, and in a form of the present invention, a method is provided for processing a stream of data that contains two or more virtual channels to form an output channel of PCM data. The stream of data is partitioned into frames, with each virtual channel represented by either a short block or a long block of frequency domain data. The method contains the following steps for each frame:

a. separating the stream of data into a plurality of channels of frequency domain data which correspond to the plurality of virtual channels and segregating the channels into those with long blocks and those with short blocks of frequency domain data;

b. specifying a coefficient for each of the channels, such that a sum of the coefficients is not greater than one;

c. mixing each of the channels of the same block type to form a downmixed frequency domain channel in proportion to the coefficients for each block type;

d. transforming the frequency domain channel into PCM data for each block type; and e. Summing all of the PCM data for each block type to form the output channel of PCM data.

In another form of the invention, a data processing device is provided that is programmed to perform the above method for processing a stream of data that contains two or more virtual channels to form an output channel of PCM data.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF THE INVENTION

Aspects of the present invention include methods and apparatus for processing and decompressing an audio data stream. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

The present invention comprises a system that is operable to efficiently decode a stream of data that has been encoded and compressed using any of a number of encoding standards, such as those defined by the Moving Pictures Expert Group (MPEG-1 or MPEG-2), or the Digital Audio Compression Standard (AC-3), for example. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG or AC-3 data streams can also contain ancillary data which may be used as system control information or to transmit associated data such as song titles or the like. The system of the present invention must recognize ancillary data and alert other systems to its presence.

Figure 1:
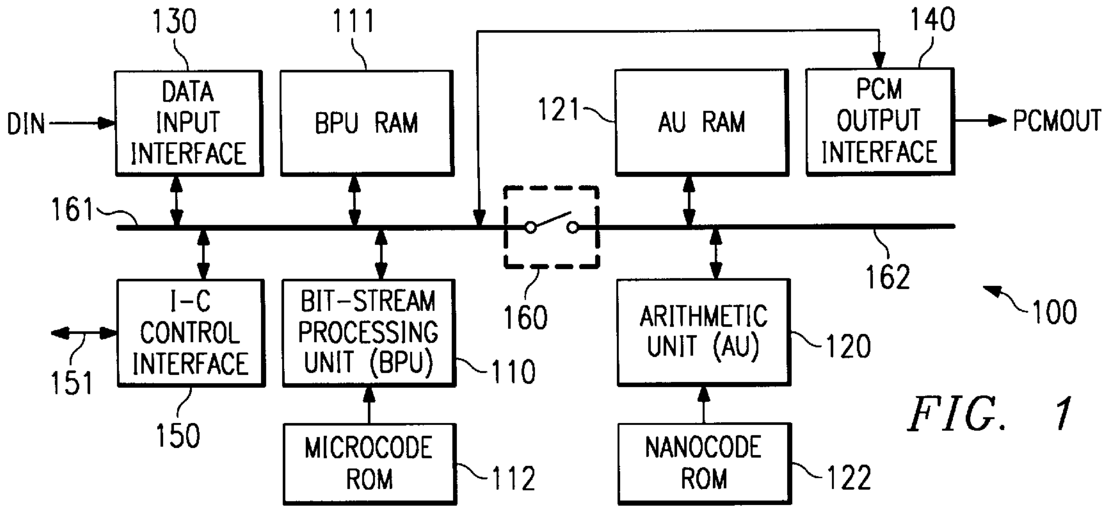
FIG. 1 is a block diagram of a data processing device constructed in accordance with aspects of the present invention.

In order to appreciate the significance of aspects of the present invention, the architecture and general operation of a data processing device which meets the requirements of the preceding paragraph will now be described. Referring to FIG. 1, which is a block diagram of a data processing device 100 constructed in accordance with aspects of the present invention, the architecture of data processing device 100 is illustrated. The architectural hardware and software implementation reflect the two very different kinds of tasks to be performed by device 100: decoding and synthesis. In order to decode a steam of data, device 100 must unpack variable length encoded pieces of information from the stream of data. Additional decoding produces a set of frequency coefficients. The second task is a synthesis filter bank that converts the frequency domain coefficients to PCM data. In addition, device 100 also needs to support dynamic range compression, downmixing, error detection and concealment, time synchronization, and other system resource allocation and management functions.

The design of device 100 includes two autonomous processing units working together through shared memory supported by multiple I/O modules. The operation of each unit is data-driven. The synchronization is carried out by the Bit-stream Processing Unit (BPU) which acts as the master processor. Bit-stream Processing Unit (BPU) 110 has a RAM 111 for holding data and a ROM 112 for holding instructions which are processed by BPU 110. Likewise, Arithmetic Unit (AU) 120 has a RAM 121 for holding data and a ROM 122 for holding instructions which are processed by AU 120. Data input interface 130 receives a stream of data on input lines DIN which is to be processed by device 100. PCM output interface 140 outputs a stream of PCM data on output lines PCMOUT which has been produced by device 100. Inter-Integrated Circuit ($I^2C$) Interface 150 provides a mechanism for passing control directives or data parameters on interface lines 151 between device 100 and other control or processing units, which are not shown, using a well known protocol. Bus switch 160 selectively connects address/data bus 161 to address/data bus 162 to allow BPU 110 to pass data to AU 120.

Figure 2:
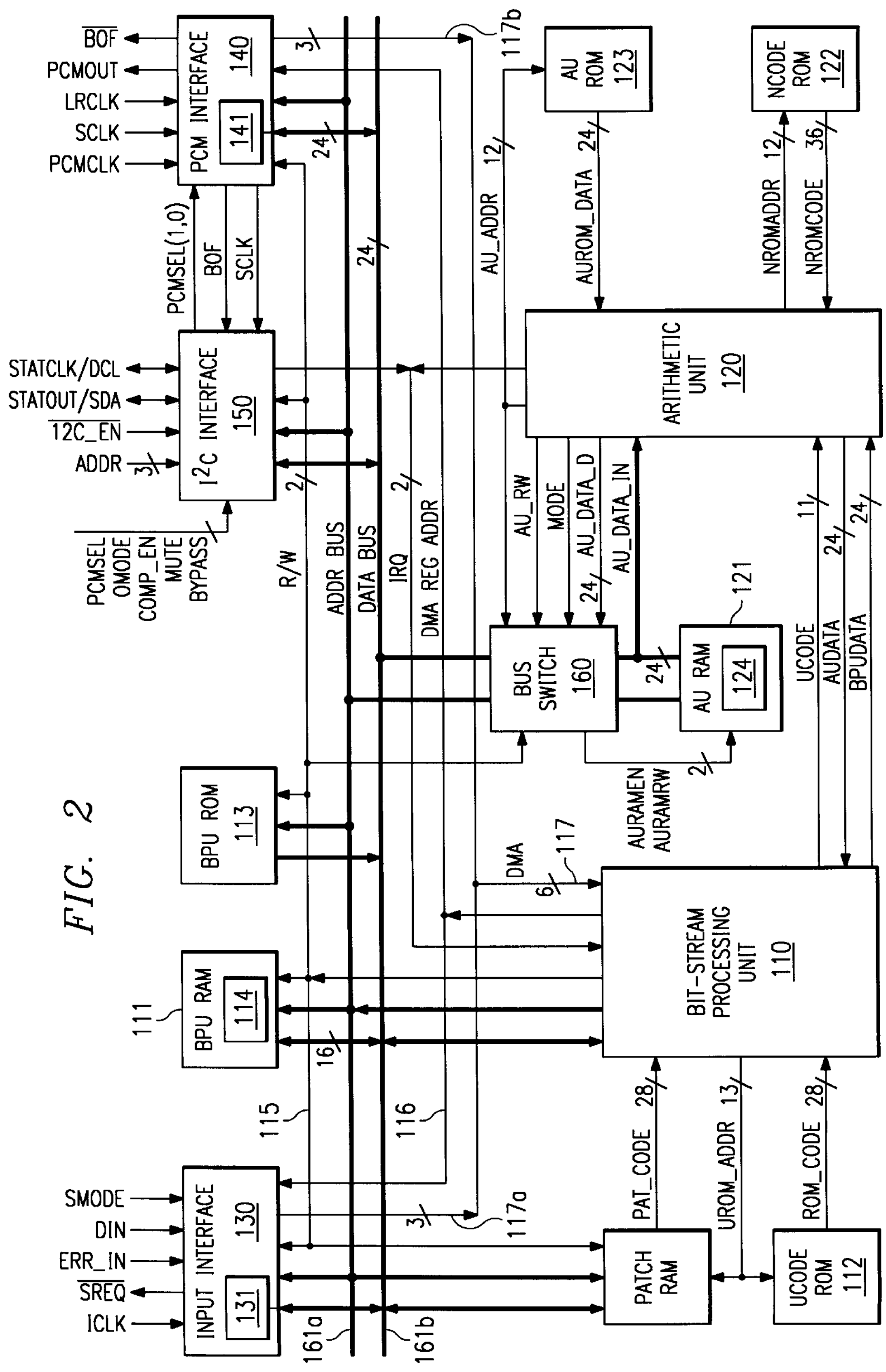
FIG. 2 is a more detailed block diagram of the data processing device of FIG. 1, illustrating interconnections of a Bit-stream Processing Unit and an Arithmetic Unit.

FIG. 2 is a more detailed block diagram of the data processing device of FIG. 1, illustrating interconnections of Bit-stream Processing Unit 110 and Arithmetic Unit 120. A BPU ROM 113 for holding data and coefficients and an AU ROM 123 for holding data and coefficients is also shown.

A typical operation cycle is as follows: Coded data arrives at the Data Input Interface 130 asynchronous to device 100's system clock, which operates at 27 MHz. Data Input Interface 130 synchronizes the incoming data to the 27 MHz device clock and transfers the data to a buffer area 114 in BPU memory 111 through a direct memory access (DMA) operation. BPU 110 reads the compressed data from buffer 114, performs various decoding operations, and writes the unpacked frequency domain coefficients to AU RAM 121, a shared memory between BPU and AU. Arithmetic Unit 120 is then activated and performs subband synthesis filtering, which produces a stream of reconstructed PCM samples which are stored in output buffer area 124 of AU RAM 121. PCM Output Interface 140 receives PCM samples from output buffer 124 through a DMA transfer and then formats and outputs them to an external D/A converter. Additional functions performed by the BPU include control and status I/O, as well as overall system resource management.

Figure 3:
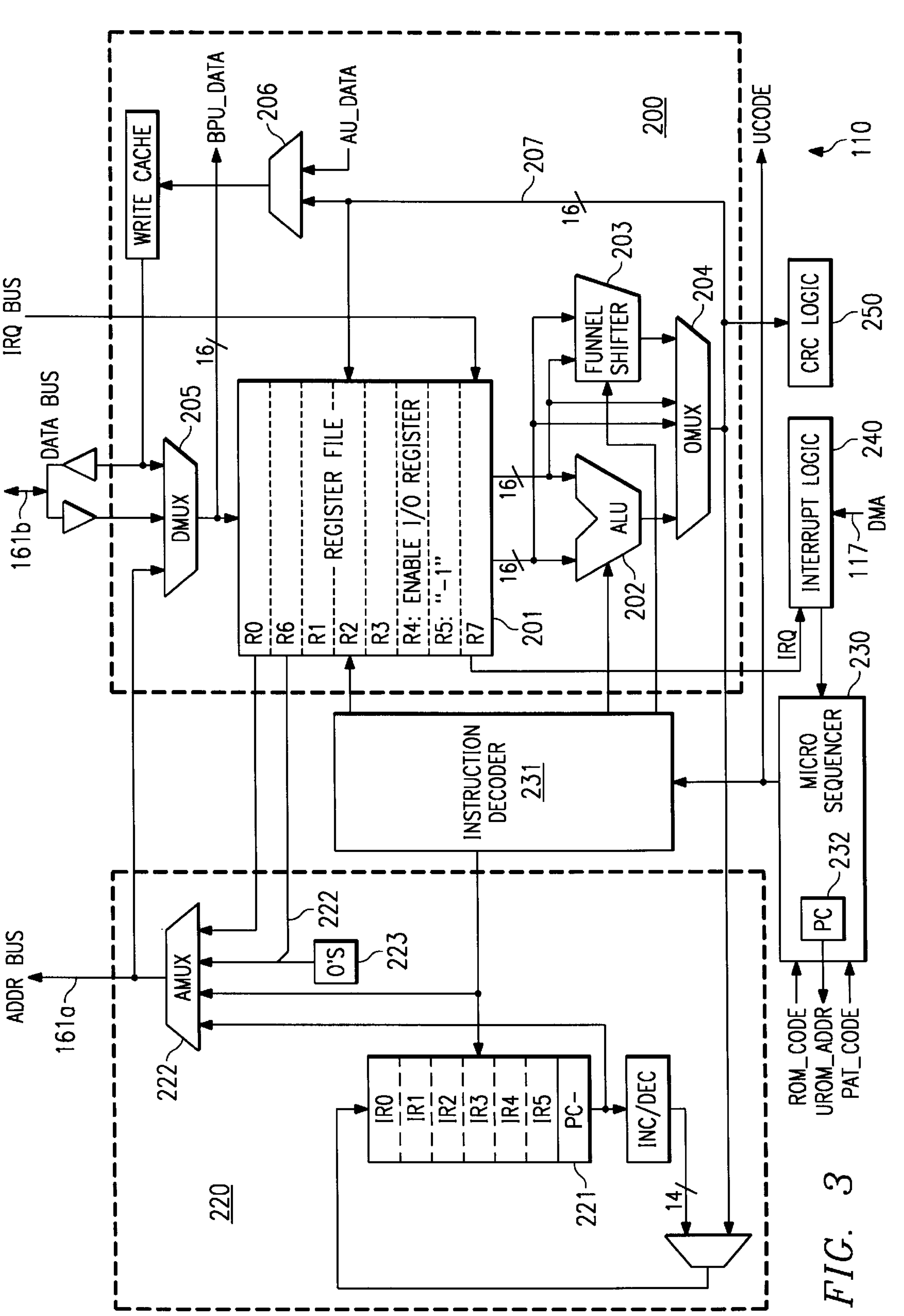
FIG. 3 is a block diagram of the Bit-stream Processing Unit of FIG. 2.

FIG. 3 is a block diagram of the Bit-stream Processing Unit of FIG. 2. BPU 110 is a programmable processor with hardware acceleration and instructions customized for audio decoding. It is a 16-bit reduced instruction set computer (RISC) processor with a register-to-register operational unit 200 and an address generation unit 220 operating in parallel.

Operational unit 200 includes a register file 201 an arithmetic/logic unit 202 which operates in parallel with a funnel shifter 203 on any two registers from register file 201, and an output multiplexer 204 which provides the results of each cycle to input mux 205 which is in turn connected to register file 201 so that a result can be stored into one of the registers.

BPU 110 is capable of performing an ALU operation, a memory I/O, and a memory address update operation in one system clock cycle. Three addressing modes: direct, indirect, and registered are supported. Selective acceleration is provided for field extraction and buffer management to reduce control software overhead. Table 1 is a list of the instruction set.

TABLE 1

BPU Instruction Set

| Instruction Mnemonics | Functional Description |
|---|---|
| And | Logical and |
| Or | Logical or |
| cSat | Conditional saturation |
| Ash | Arithmetic shift |
| LSh | Logic shift |
| RoRC | Rotate right with carry |
| GBF | Get bit-field: |
| Add | Add |
| AddC | Add with carry |
| cAdd | Conditional add |
| Xor | Logical exclusive or |
| Sub | Subtract |
| SubB | Subtract with borrow |
| SubR | Subtract reversed |
| Neg | 2's complement |
| cNeg | Conditional 2's complement |
| Bcc | Conditional branch |
| DBcc | Decrement & conditional branch |
| IOST | IO reg to memory move |
| IOLD | Memory to IO reg move |
| auOp | AU operation - loosely coupled |
| auEx | AU execution - tightly coupled |
| Sleep | Power down unit |

BPU 110 has two pipeline stages: Instruction Fetch/Predecode which is performed in Micro Sequencer 230, and Decode/Execution which is performed in conjunction with instruction decoder 231. The decoding is split and merged with the Instruction Fetch and Execution respectively. This arrangement reduces one pipeline stage and thus branching overhead. Also, the shallow pipe operation enables the processor to have a very small register file (four general purpose registers, a dedicated bit-stream address pointer, and a control/status register) since memory can be accessed with only a single cycle delay.

Figure 4:
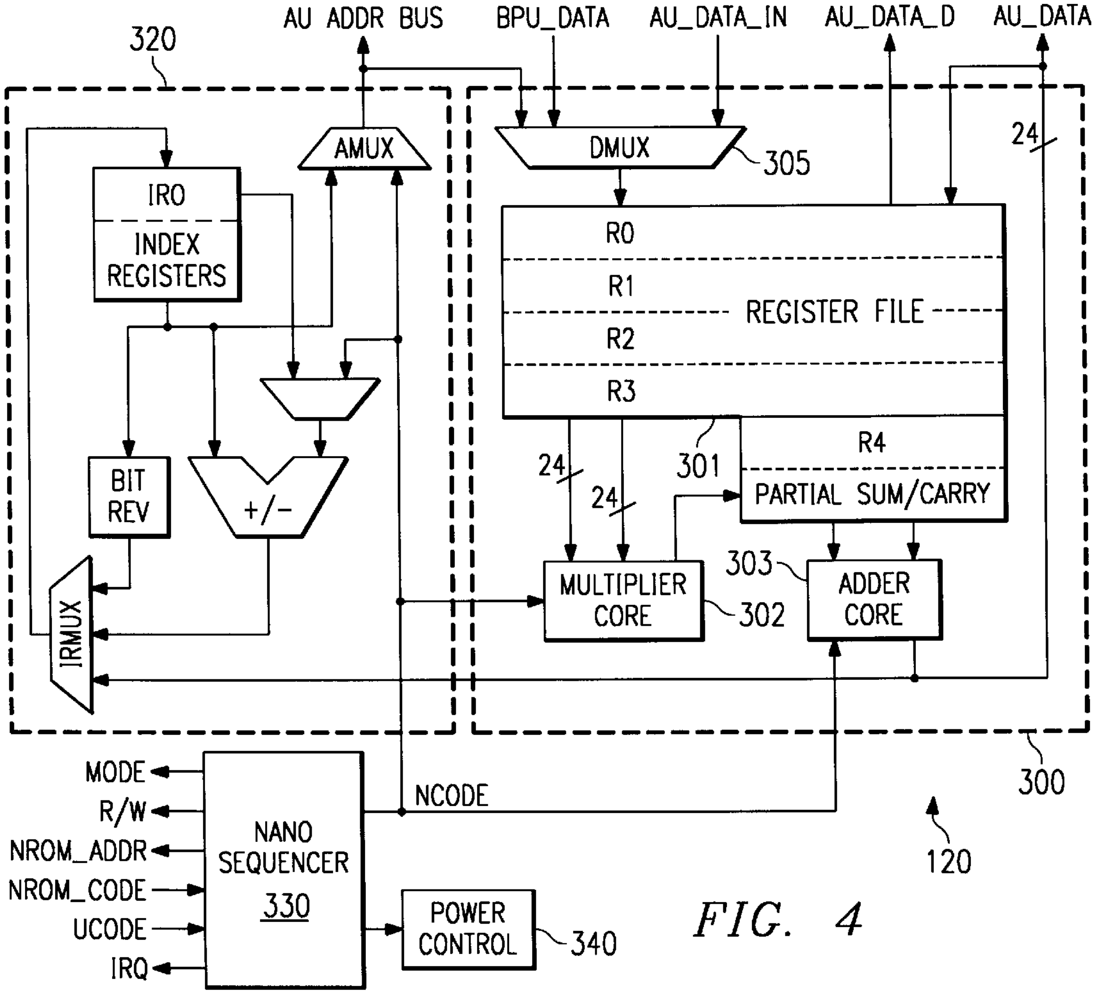
FIG. 4 is a block diagram of the Arithmetic Unit of FIG. 2.

FIG. 4 is a block diagram of the Arithmetic Unit of FIG. 2. Arithmetic unit 120 is a programmable fixed point math processor that performs the subband synthesis filtering. A complete description of subband synthesis filtering is provided in U.S. Pat. No. 5,644,310 entitled *Integrated Audio Decoder System And Method Of Operation* or U.S. Pat. No. 5,659,423 entitled *Hardware Filter Circuit And Address Circuitry For MPEG Encoded Data*, both assigned to the assignee of the present application, which is included herein by reference; in particular, FIGS. 7–9 and 11–31 and related descriptions.

The AU 120 module receives frequency domain coefficients from the BPU by means of shared AU memory 121. After the BPU has written a block of coefficients into AU memory 121, the BPU activates the AU through a coprocessor instruction, auOp. BPU 110 is then free to continue decoding the audio input data. Synchronization of the two processors is achieved through interrupts, using interrupt circuitry 240 (shown in FIG. 3).

AU 120 is a 24-bit RISC processor with a register-to-register operational unit 300 and an address generation unit 320 operating in parallel. Operational unit 300 includes a register file 301, a multiplier unit 302 which operates in conjunction with an adder 303 on any two registers from register file 301. The output of adder 303 is provided to input mux 305 which is in turn connected to register file 301 so that a result can be stored into one of the registers.

A bit-width of 24 bits in the data path in the arithmetic unit was chosen so that the resulting PCM audio will be of superior quality after processing. The width was determined by comparing the results of fixed point simulations to the results of a similar simulation using double-precision floating point arithmetic. In addition, double-precision multiplies are performed selectively in critical areas within the subband synthesis filtering process.

Figure 5:
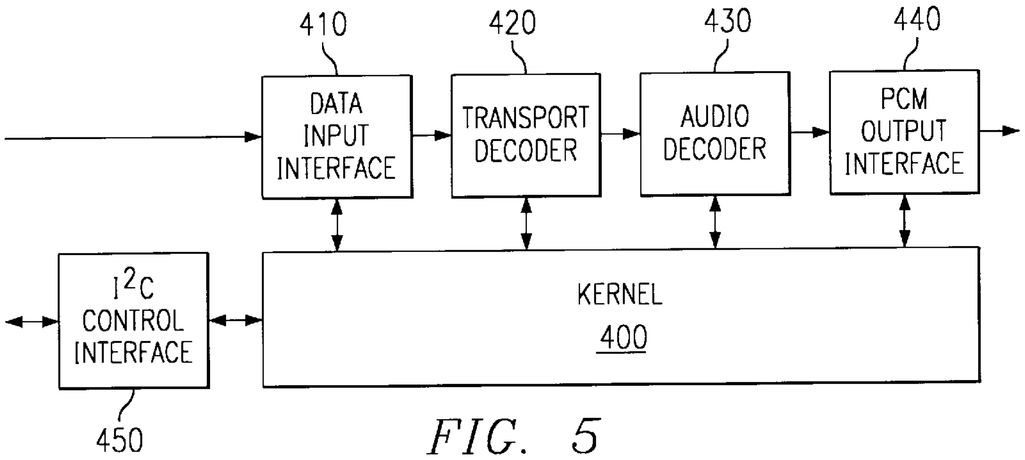
FIG. 5 is a block diagram illustrating the architecture of the software which operates on the device of FIG. 1.

FIG. 5 is a block diagram illustrating the architecture of the software which operates on data processing device 100. Each hardware component in device 100 has an associated software component, including the compressed bit-stream input, audio sample output, host command interface, and the audio algorithms themselves. These components are overseen by a kernel that provides real-time operation using interrupts and software multi-tasking.

The software architecture block diagram is illustrated in FIG. 5. Each of the blocks corresponds to one system software task. These tasks run concurrently and communicate via global memory 111. They are scheduled according to priority, data availability, and synchronized to hardware using interrupts. The concurrent data-driven model reduces RAM storage by allowing the size of a unit of data processed to be chosen independently for each task.

The software operates as follows. Data Input Interface 410 buffers input data and regulates flow between the external source and the internal decoding tasks. Transport Decoder 420 strips out packet information from the input data and emits a raw AC-3 or MPEG audio bit-stream, which is processed by Audio Decoder 430. PCM Output Interface 440 synchronizes the audio data output to a system-wide absolute time reference and, when necessary, attempts to conceal bit-stream errors. $I^2C$ Control Interface 450 accepts configuration commands from an external host and reports device status. Finally, Kernel 400 responds to hardware interrupts and schedules task execution.

Figure 6:
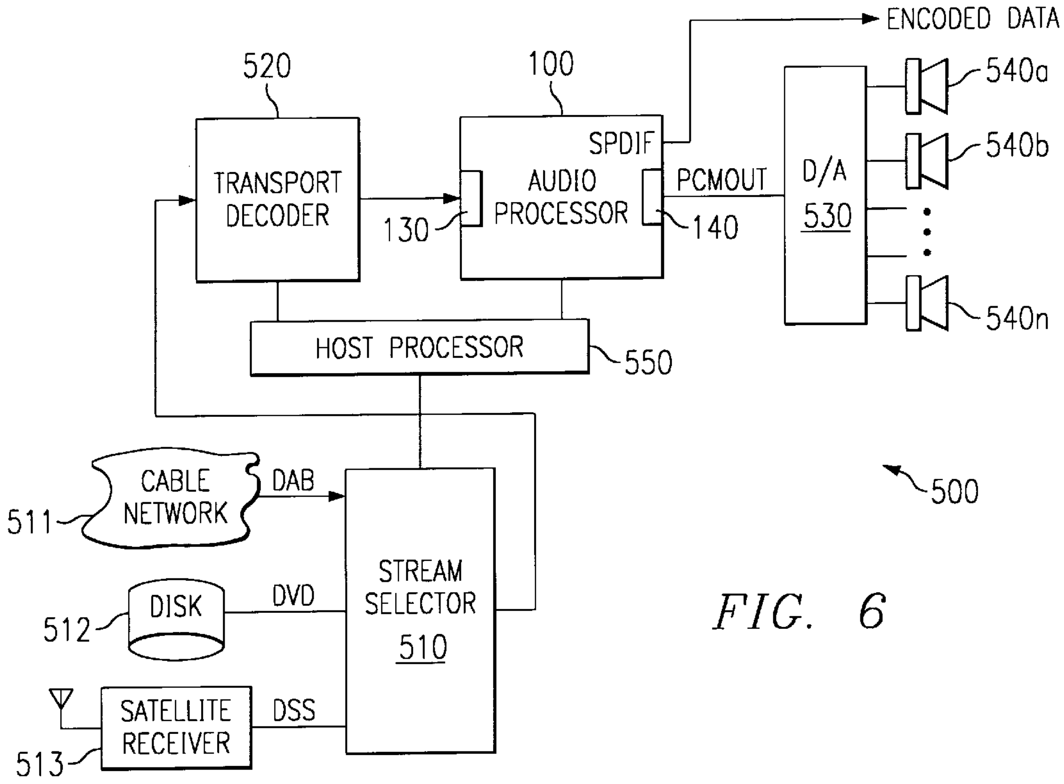
FIG. 6 is a block diagram illustrating an audio reproduction system which includes the data processing device of FIG. 1.

FIG. 6 is a block diagram illustrating an audio reproduction system 500 which includes the data processing device of FIG. 1. Stream selector 510 selects a transport data stream from one or more sources, such as a cable network system 511, digital video disk 512, or satellite receiver 513, for example. A selected stream of data is then sent to transport decoder 520 which separates a stream of audio data from the transport data stream according to the transport protocol, such as MPEG or AC-3, for that stream. Transport decoder typically recognizes a number of transport data stream formats, such as direct satellite system (DSS), digital video disk (DVD), or digital audio broadcasting (DAB), for example. The selected audio data stream is then sent to data processing device 100 via input interface 130. Device 100 unpacks, decodes, and filters the audio data stream, as discussed previously, to form a stream of PCM data which is passed via PCM output interface 140 to D/A device 530. D/A device 530 then forms at least one channel of analog data which is sent to a speaker subsystem 540*a*. Typically, A/D 530 forms two channels of analog data for stereo output into two speaker subsystems 540*a* and 540*b*. Processing device 100 is programmed to downmix an MPEG-2 or AC-3 system with more than two channels, such as 5.1 channels, to form only two channels of PCM data for output to stereo speaker subsystems 540*a* and 540*b*.

Alternatively, processing device 100 can be programmed to provide up to six channels of PCM data for a 5.1 channel sound reproduction system if the selected audio data stream conforms to MPEG-2 or AC-3. In such a 5.1 channel system, D/A 530 would form six analog channels for six speaker subsystems 540*a–n*. Each speaker subsystem 540 contains at least one speaker and may contain an amplification circuit (not shown) and an equalization circuit (not shown).

The SPDIF (Sony/Philips Digital Interface Format) output of device 100 conforms to a subset of the Audio Engineering Society's AES3 standard for serial transmission of digital audio data. The SPDIF format is a subset of the minimum implementation of AES3. This stream of data can be provided to another system (not shown) for further processing or re-transmission.

Figure 7:
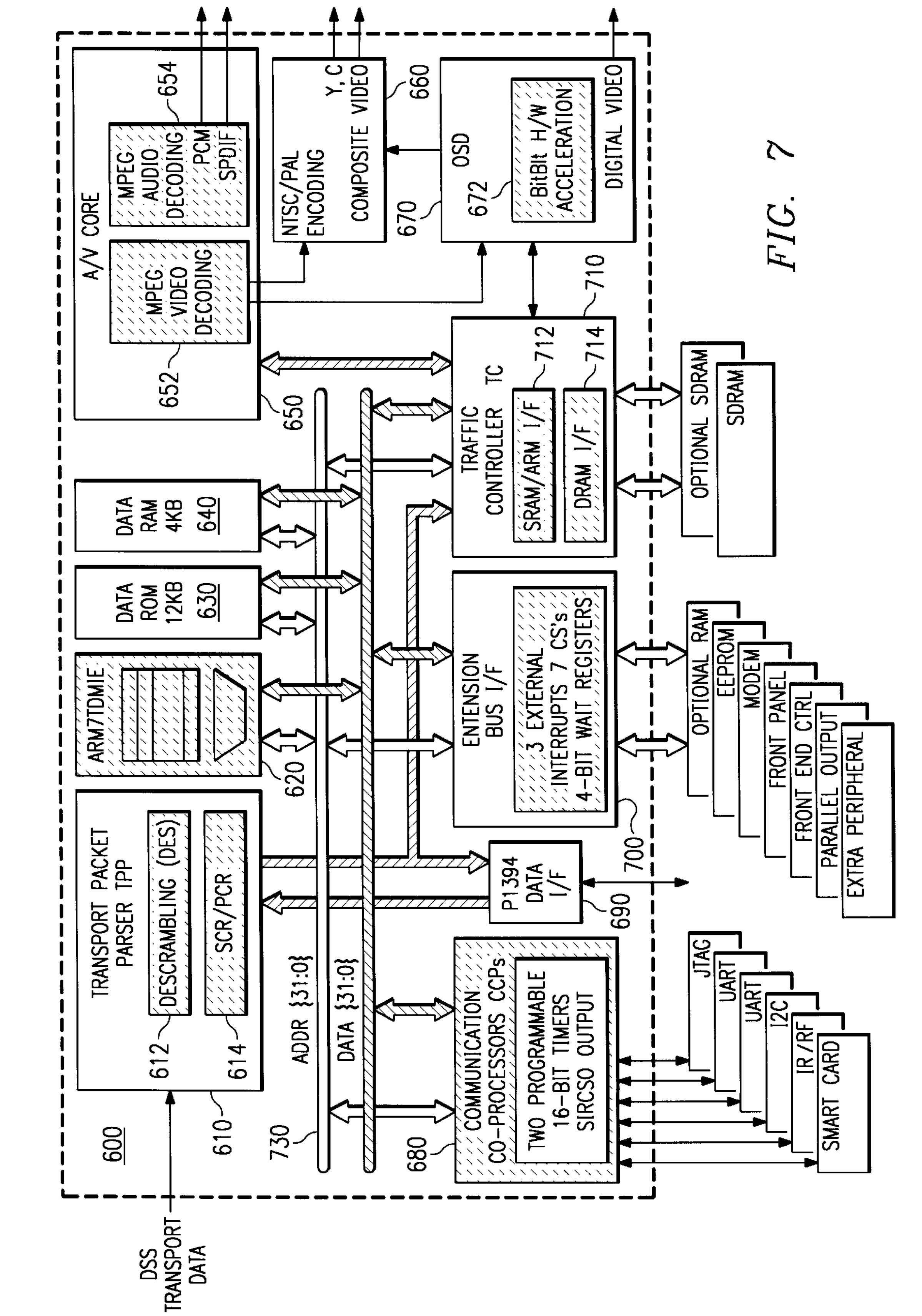
FIG. 7 is a block diagram of an integrated circuit which includes the data processing device of FIG. 1 in combination with other data processing devices, the integrated circuit being connected to various external devices.

Referring now to FIG. 7 there may be seen a functional block diagram of a circuit 300 that forms a portion of an audio-visual system which includes aspects of the present invention. More particularly, there may be seen the overall functional architecture of a circuit including on-chip interconnections that is preferably implemented on a single chip as depicted by the dashed line portion of FIG. 7. As depicted inside the dashed line portion of FIG. 7, this circuit consists of a transport packet parser (TPP) block 610 that includes a bit-stream decoder or descrambler 612 and clock recovery circuitry 614, an ARM CPU block 620, a data ROM block 630, a data RAM block 640, an audio/video (A/V) core block 650 that includes an MPEG-2 audio decoder 654 and an MPEG-2 video decoder 652, an NTSC/PAL video encoder block 660, an on screen display (OSD) controller block 670 to mix graphics and video that includes a bit-blt hardware (H/W) accelerator 672, a communication coprocessor (CCP) block 680 that includes connections for two UART serial data interfaces, infra red (IR) and radio frequency (RF) inputs, SIRCS input and output, an $I^2C$ port and a Smart Card interface, a P1394 interface (I/F) block 690 for connection to an external 1394 device, an extension bus interface (I/F) block 700 to connect peripherals such as additional RS232 ports, display and control panels, external ROM, DRAM, or EEPROM memory, a modem and an extra peripheral, and a traffic controller (TC) block 710 that includes an SRAM/ARM interface (I/F) 712 and a DRAM I/F 714. There may also be seen an internal 32 bit address bus 320 that interconnects the blocks and seen an internal 32 bit data bus 730 that interconnects the blocks. External program and data memory expansion allows the circuit to support a wide range of audio/video systems, especially, as for example, but not limited to set-top boxes, from low end to high end.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. Thus, audio decoder 354 is the same as data processing device 100 with suitable modifications of interfaces 130, 140, 150 and 170. This results in a simpler and cost-reduced single chip implementation of the functionality currently available only by combining many different chips and/or by using special chipsets.

Figure 8:
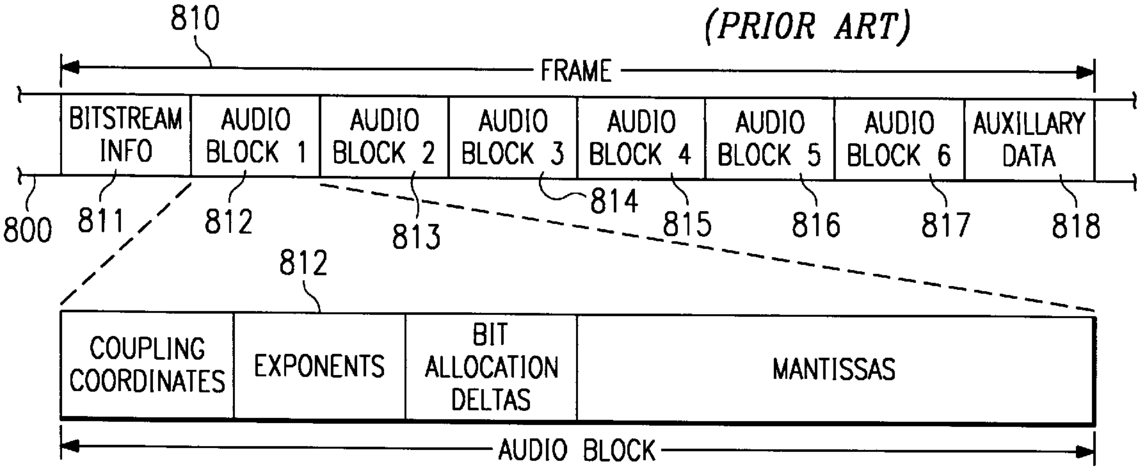
FIG. 8 (PRIOR ART)
FIG. 8 illustrates the format of a frame and block of a stream of audio data according to the AC-3 specification.

A novel aspect of data processing device 100 will now be discussed in detail, with reference to FIGS. 8–11. FIG. 8 illustrates the format of a frame 810 and a block 812 of a stream of audio data 800 according to the Dolby Audio Compression Standard, AC-3, which is well known. Header 811 includes bitstream information which describes the contents of frame 810. Audio blocks 812–817 contain frequency domain data for six channels of audio, according to the AC-3 standard. The channels typically represent left, right, center, left surround, right surround, and low frequency effect channels. Audio block 812 is representative of all six audio blocks and contains coupling coordinates, exponents, bit allocation deltas and mantissas for the subband encoded frequency domain data of audio channel 1.

Figure 9:
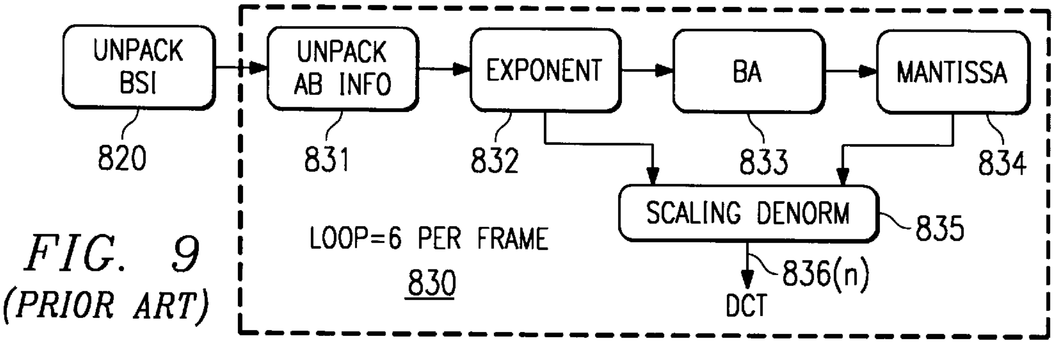
FIG. 9 (PRIOR ART)
FIG. 9 is s flow chart illustrating a prior art method for unpacking and decoding the AC-3 bit stream and audio blocks.

FIG. 9 illustrates a prior art method for unpacking and decoding the AC-3 bit stream and audio blocks. Step 820 unpacks bit stream information contained in header 811. Step 831 unpacks audio block information contained in audio block 812 and step 832 determines exponent values, step 833 determines the number of bits allocated to each mantissa value, and step 834 determines mantissa values. Step 835 uses the exponent values and mantissa values to scale and denormalize the frequency domain subband components. The scaled subband components are then ready for transformation to PCM data using a discrete cosine transform (DCT) modulated filter bank. Steps 831–835 are then repeated five more times in loop 830 to decode audio blocks 813–817.

Figure 10:
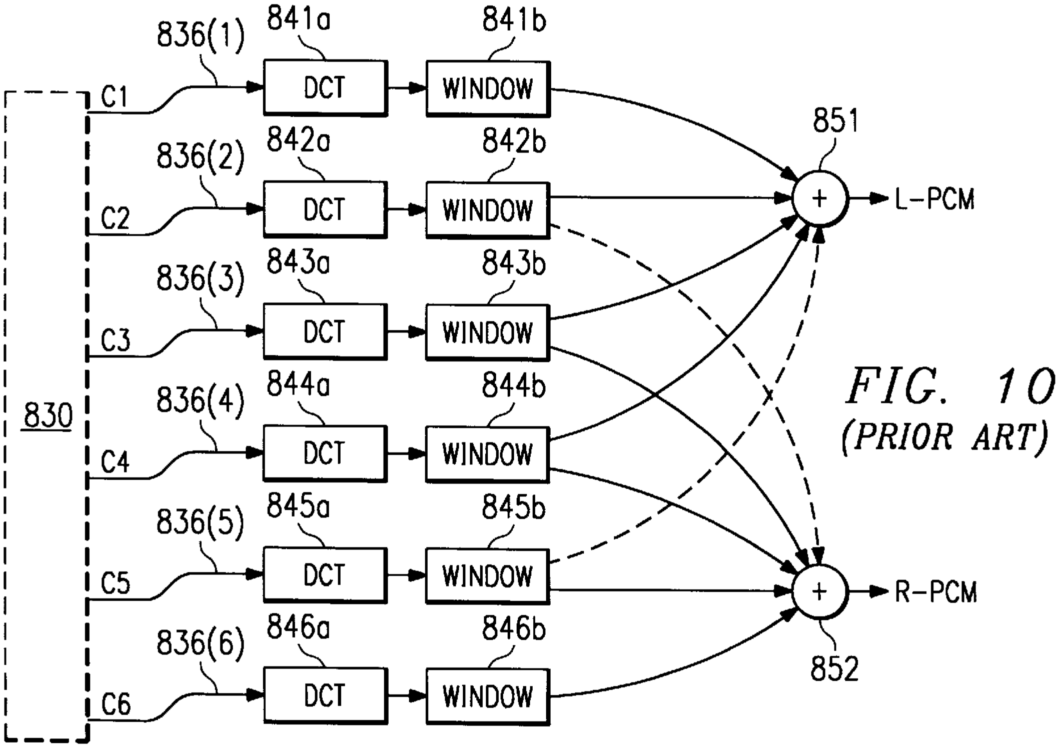
FIG. 10 (PRIOR ART)
FIG. 10 is a flow chart illustrating a prior art method for transforming the unpacked audio blocks into right and left channels of PCM data.

FIG. 10 is a flow chart illustrating a prior art method for transforming the unpacked audio blocks into right and left channels of PCM data. DCT 841*a*, together with window 841*b*, receives the scaled subband data from audio block 1 from loop 830 on arc 836(1) and produces PCM data representative of audio channel 1. Likewise, DCTs 842*a*–846*a* and windows 842*b*–846*b* produce PCM data representative of audio channels 2–6. For many applications, only two channels are desired for stereo audio. In this case, the six channels of PCM data are downmixed by mixer 851 to form a left PCM channel L-PCM and a right PCM channel R-PCM.

Figure 11:
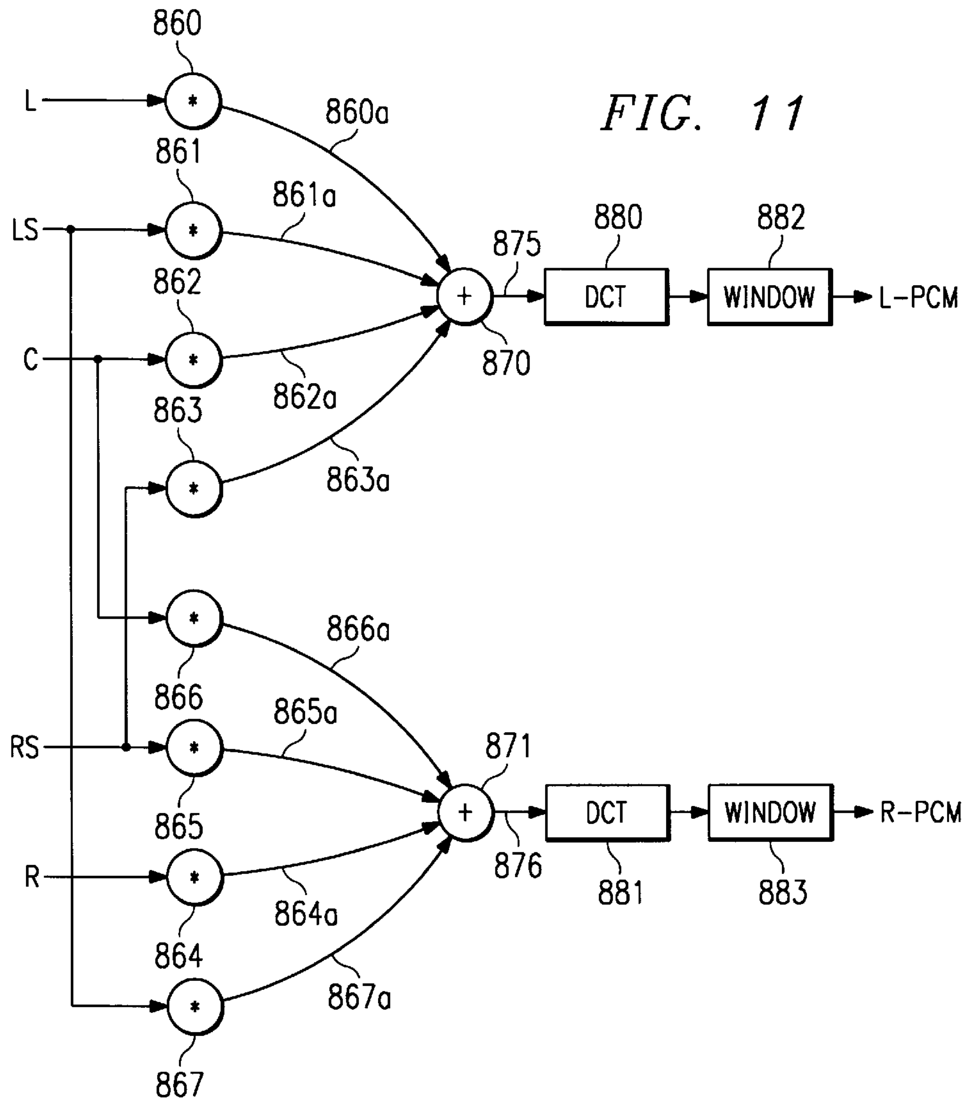
FIG. 11 is a flow chart illustrating an improved method of transforming the decoded AC-3 audio data of FIG. 9, according to an aspect of the present invention.

FIG. 11 is a flow chart illustrating an improved method of transforming the decoded AC-3 audio data of FIG. 9, according to an aspect of the present invention. Prior to transformation and while still in the frequency domain, several audio channels are downmixed to form a single frequency domain channel, and then converted to a PCM data stream using a DCT and window. Advantageously and according to an aspect of the present invention, fewer DCT and window steps are required in this manner than in the prior art method illustrated in FIG. 10. Since a DCT and windowing step is computationally intensive, the amount of processing required to convert a subband encoded data stream to a PCM data stream is significantly reduced using a method according to this aspect of the present invention. A common allocation of audio channels in an AC-3 system is the 5.1 format, which assigns six channels as follows: left, left surround, center, right, right surround, and low frequency effects. For a typical conventional stereo audio reproduction system, the left, left surround and center channels are combined to form the left audio channel; while the right, right surround and center channels are combined to form the right audio channel. The low frequency channel is ignored. For a surround encoded stereo audio reproduction system, the left, left surround, right surround, and center channels are combined to form the left audio channel; while the right, right surround, left surround, and center channels are combined to form the right audio channel.

Referring still to FIG. 11, in order to form an output channel of PCM data, selected frequency domain audio channels are scaled by a preselected coefficient in steps 860–867. Three or four channels are downmixed to form a left frequency domain channel 875: left channel L, left surround channel Ls, right surround Rs and center channel C. Likewise, three or four channels are downmixed to form right frequency domain channel 876: right channel R, right surround channel Rs, left surround Ls and center channel C. Note that channel C is downmixed into both channels 875 and 876. Also note that channels Rs and Ls are optionally combined into channels 875 and 876, depending on the downmix type (conventional or surround).

For left channel 875, a set of left coefficients is selected that specify the relative amounts of each constituent channel. The sum of all of the left coefficients must be less than or equal to 1 in order to avoid saturation of the left output PCM stream. Coefficient scaling steps 860–863 apply the left coefficients to respective channels to form scaled channels 860*a*–863*a*. The scaled channels are then mixed in mixer step 870 to form left frequency domain channel 875. The overall operation is as follows:

chan 875=L(coeff 860)+Ls(coeff 861)+C(coeff 862) for conventional stereo, or chan 875=L(coeff 860)+Ls(coeff 861)+Rs(coeff 863)+C (coeff 862) for surround encoded stereo DCT 880 and window 882 then transforms left frequency domain channel 875 into left PCM data stream L-PCM.

Likewise, for right channel 876, a set of right coefficients is selected that specify the relative amounts of each constituent channel. The sum of all of the right coefficients must be less than or equal to 1 in order to avoid saturation of the right output PCM stream. Coefficient scaling steps 864–867 apply the right coefficients to respective channels to form scaled channels 864*a*–867*a*. The scaled channels are then mixed in mixer step 871 to form right frequency domain channel 876. The overall operation is as follows:

chan 876=R(coeff 864)+Rs(coeff 865)+C(coeff 866) for conventional stereo, or chan 876=R(coeff 864)+Rs(coeff 865)+C(coeff 866)+Ls (coeff 867) for surround encoded stereo DCT 881 and window 883 then transforms right frequency domain channel 876 into right PCM data stream R-PCM.

Still referring to FIG. 11, this figure is a generic illustration of the overall conversion process. However, since AC-3 streams of data are formatted as long blocks and short blocks of frequency domain subband components, additional steps are required to completely implement the process, as described with reference to FIGS. 12–14.

Figure 12:
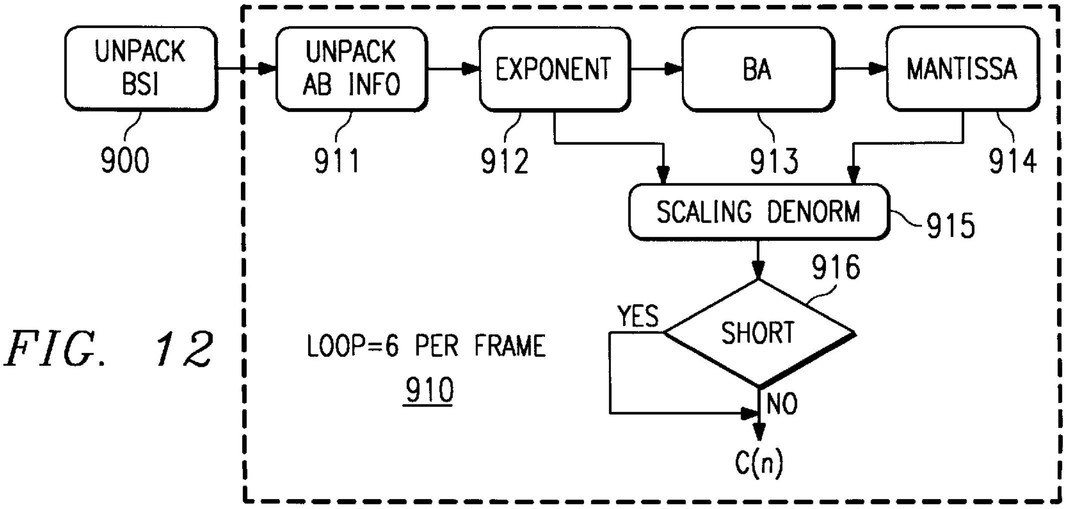
FIG. 12 is a flow chart illustrating an improved method of unpacking and decoding an AC-3 stream of audio data, according to an aspect of the present invention.

FIG. 12 is a flow chart illustrating an improved method of unpacking and decoding an AC-3 stream of audio data, according to an aspect of the present invention. Step 900 unpacks bit stream information contained in header 811. Step 911 unpacks audio block information contained in audio block 812 and step 912 determines exponent values, step 913 determines the number of bits allocated to each mantissa value, and step 914 determines mantissa values. Step 915 uses the exponent values and mantissa values to scale and denormalize the frequency domain subband components. According to an aspect of the present invention, the block of scaled subband components are then marked as being a short block or a long block in step 916. The header of each frame, such as header 811 in FIG. 8, specifies the block size of each channel. A long block represent 256 PCM samples and is encoded with a 256 point DCT, while a short block also represent 256 PCM samples, but is encoded with two 128 point DCTs. Long blocks provide more frequency information and therefore result in better signal reproduction. Short blocks are encoded when a large frequency change occurs within a block of frequency domain data. This can occur in response to a large change in amplitude of an input audio signal, for example. Steps 911–917 are then repeated five more times in loop 910 to decode audio blocks 813–817.

Figure 13:
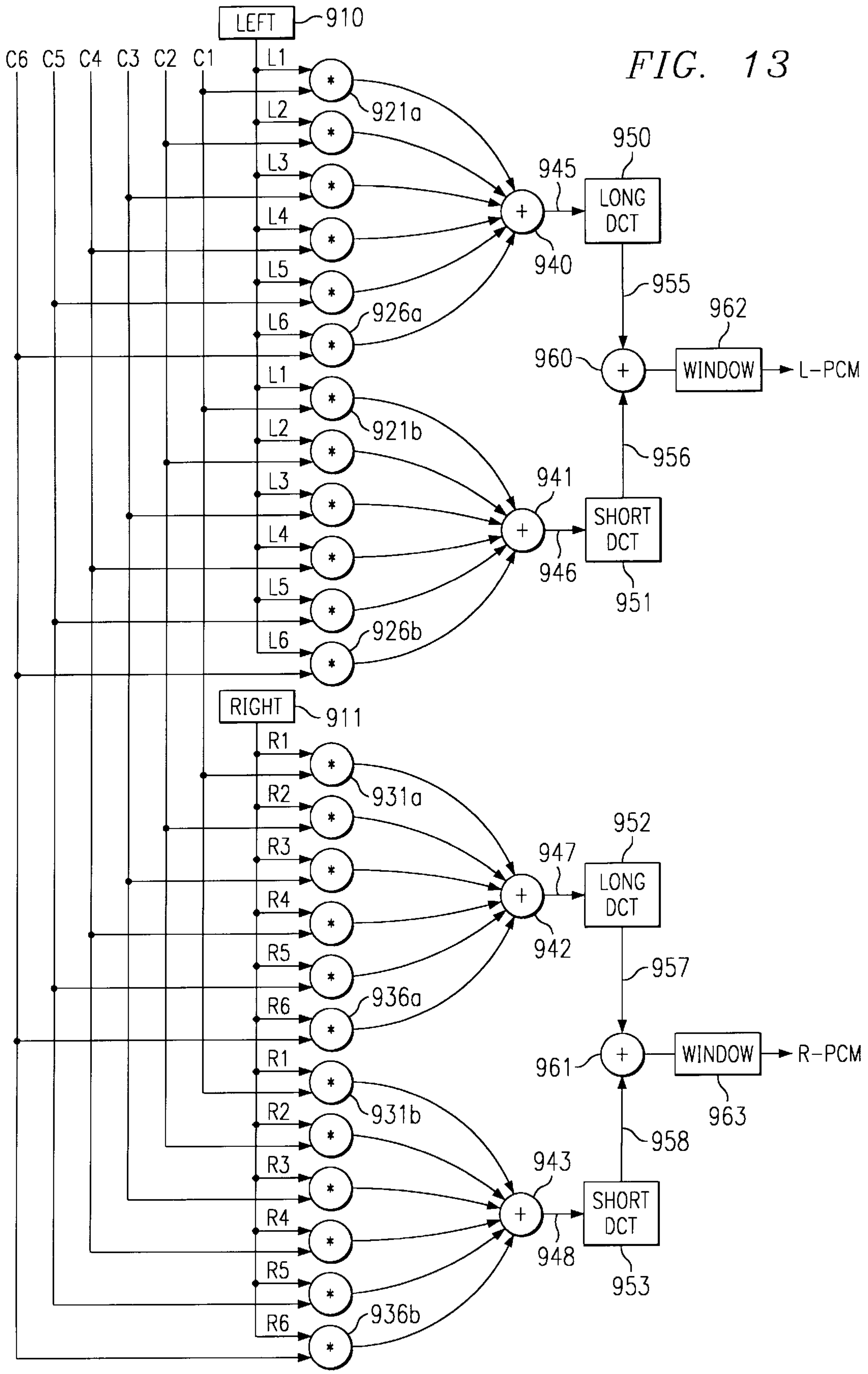
FIG. 13 is a flow chart illustrating an improved method of transforming the decoded AC-3 audio data of FIG. 12, according to an aspect of the present invention.

FIG. 13 is a flow chart illustrating an improved method of transforming the decoded AC-3 audio data of FIG. 12, according to an aspect of the present invention. Prior to transformation and while still in the frequency domain, the audio channels C1–C6 are downmixed to form a single frequency domain channel, and then converted to a PCM data stream using a DCT and a window. Advantageously and according to an aspect of the present invention, fewer DCT steps are required in this manner than in the prior art method illustrated in FIG. 10. Since a DCT step is computationally intensive, the amount of processing required to convert a subband encoded data stream to a PCM data stream is significantly reduced using a method according to this aspect of the present invention.

Referring still to FIG. 13, in order to form a left output channel of PCM data L-PCM, each frequency domain audio channel C1–C6 is scaled by a preselected left coefficient in scaling steps 921*a*–926*a* or 921*a*–926*b*. A set of left coefficients is stored in storage circuit 910. The sum of all of the left coefficients must be less than or equal to 1 in order to avoid saturation of the left output PCM stream. Each left coefficient specifies what percentage of the left output channel will be provided by the associated frequency domain audio channel. The same left coefficient L1 is provided to scaling step 921*a* and 921*b*. If a channel C1 block is long, then step 921*a* scales the block and provides it to mixer step 940. However, if channel block C1 is short, then scaling step 921*a* provides a nil output and scaling step 921*b* provides a scaled output to mixer step 941. Furthermore, if no component of channel C1 is to be included in output L-PCM, then coefficient L1 is set to zero. In this manner, scaled long blocks are downmixed by mixer step 940 to form long left frequency domain channel 945 and scaled short blocks are downmixed by mixer step 941 to form short left frequency domain channel 946. The overall operation is as follows:

chan 945=C1(L1)+C2(L2)+C3(L3)+C4(L4)+C5(L5)+C6 (L6)

where: any term that includes a short block is deleted chan 946=C1(L1)+C2(L2)+C3(L3)+C4(L4)+C5(L5)+C6 (L6)

where: any term that includes a long block is deleted

Long DCT 950 then transforms long left frequency domain channel 945 into long left PCM data stream 955, while short DCT 951 transforms short left frequency domain channel 946 into short left PCM data stream 956. Mixer 960 and window 962 then combines long left PCM 955 and short left PCM 956 to form left output PCM channel L-PCM by performing steps of windowing, overlapping and adding. These final steps are known by those skilled in the art, and do not need to be explained in detail herein.

Referring still to FIG. 13, in order to form a right output channel of PCM data R-PCM, each frequency domain audio channel C1–C6 is scaled by a preselected right coefficient in scaling steps 931*a*–936*a* or 931*a*–936*b*. A set of right coefficients is stored in storage circuit 911. Storage circuits 910 and 911 are sets of memory mapped registers in data processing device 100 and can be modified by an external host processor using $I^2C$ interface 150. Alternatively, left and right channel coefficients can be stored in RAM or ROM. The sum of all of the right coefficients must be less than or equal to 1 in order to avoid saturation of the right output PCM stream. Each right coefficient specifies what percentage of the right output channel will be provided by the associated frequency domain audio channel. The same right coefficient R1 is provided to scaling step 931*a* and 931*b*. If a channel C1 block is long, then step 931*a* scales the block and provides it to mixer step 942. However, if channel block C1 is short, then scaling step 931*a* provides a nil output and scaling step 931b provides a scaled output to mixer step 943. Furthermore, if no component of channel C1 is to be included in output R-PCM, then coefficient R1 is set to zero. In this manner, scaled long blocks are downmixed by mixer step 942 to form long right frequency domain channel 947 and scaled short blocks are downmixed by mixer step 943 to form short right frequency domain channel 948. The overall operation is as follows:

chan 947=C1(R1)+C2(R2)+C3(R3)+C4(R4)+C5(R5)+C6(R6)

where: any term that includes a short block is deleted chan 948=C1(R1)+C2(R2)+C3(R3)+C4(R4)+C5(R5)+C6(R6)

where: any term that includes a long block is deleted

Long DCT 952 then transforms long right frequency domain channel 947 into long right PCM data stream 957, while short DCT 953 transforms short right frequency domain channel 948 into short right PCM data stream 958. Mixer 961 and window 963 then combines long right PCM 957 and short right PCM 958 to form right output PCM channel R-PCM by performing steps of windowing, overlapping and adding.

Figure 14:
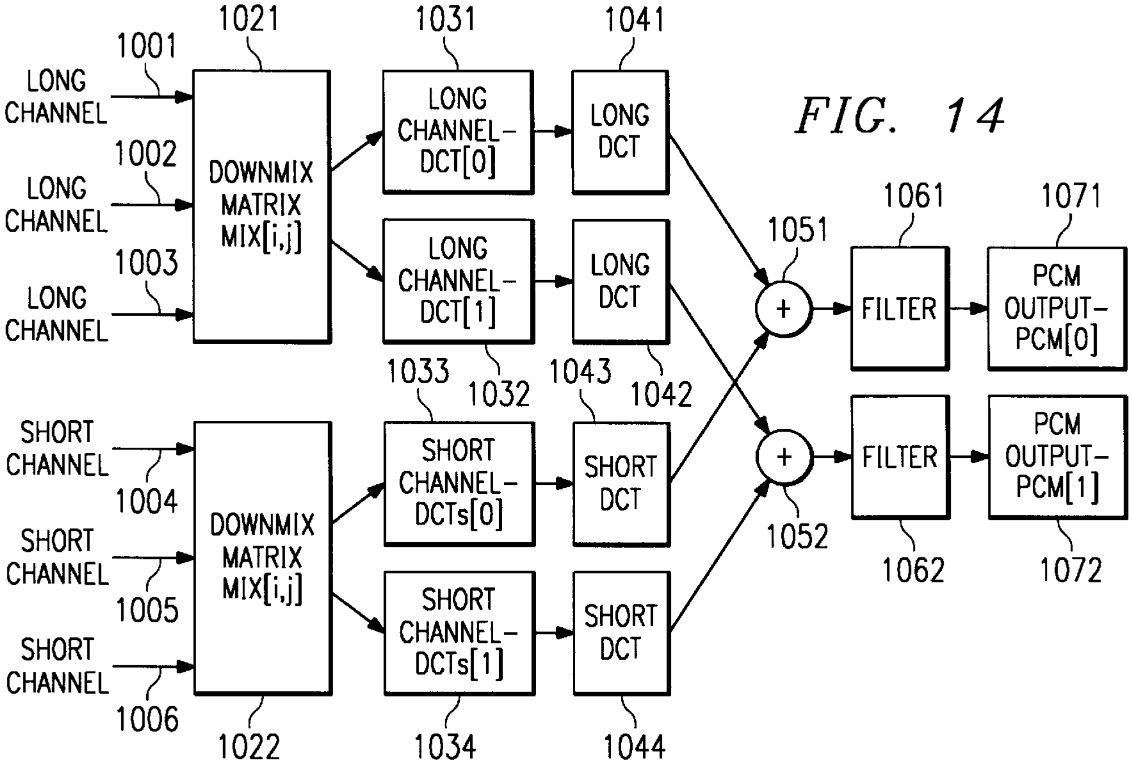
FIG. 14 is a flow chart illustrating another embodiment of an improved method of transforming the decoded AC-3 audio data of FIG. 12, according to an aspect of the present invention.

FIG. 14 is a flow chart illustrating another embodiment of an improved method of transforming the decoded AC-3 audio data of FIG. 12, according to an aspect of the present invention. As discussed with reference to FIG. 13, an improved method differs from prior methods in the order of operations. Downmixing is performed before the DCT operations, which reduces the number of DCT operations required. In AC-3, downmixing is the process of taking a 5.1 channel audio signal, and combining channels to present a 2 channel audio signal which retains the gross spatial content of the original. For the purposes of this description, the 0.1 channel will be taken to be a full bandwidth channel. That is, the input will be described as consisting of 6 identical audio signals. These modifications advantageously reduce the number of DCT operations needed with respect to prior methods from six to four.

FIG. 14 illustrates processing of one frame of data which has been decoded according to FIG. 12; the decoding process resulted in three channels 1001–1003 being in long block format and three channels 1004–1006 being in short block format. Note that for any given frame the number of channels in short and long block format depends on the signal characteristics of the encoded audio signals. A given frame may have six long blocks or six short blocks, or any combination. Therefore, FIG. 14 illustrates only one of many possible combinations and should not be considered as a limitation. Because audio blocks in AC-3 can be coded using either a short or long DCT, input audio channels which are coded using short blocks are first downmixed separately from those coded using long blocks. The two downmixed versions are combined prior to the filtering operation in the latter stage of the synthesis filter bank. The method illustrated in FIG. 14 proceeds as follows:

Step 1—Prepare buffers in AU RAM 121 (FIG. 2) by allocating space and initializing read and write pointers:

prepare 2 long DCT input buffers DCT[j,n] 1031 and 1032;

where: j is 0 for left and 1 for right; n is 256 prepare 2 short DCT input buffers DCTs[j,n] 1033 and 1034; and prepare 2 PCM output buffers PCM[j,n] 1071 and 1072.

Step 2—Calculate a 6 by 2 long downmix matrix MIX[i,j] 1021 and a 6 by 2 short downmix matrix MIXs[i,j] 1022.

Matrix 1021 is composed of a set of left coefficients and a set of right coefficients for each audio channel, but with entries set to zero for channels which are short blocks. Likewise, matrix 1022 is composed of the set of left coefficients and the set of right coefficients for each audio channel, but with entries set to zero for channels which are long blocks.

Step 3—Decode and downmix—for each input channel i 1001–1006

For each transform coefficient n: decode transform coefficient tc and downmix into the appropriate DCT buffer. Each tc is scaled by matrix MIX[i,j] and accumulated into buffer DCT[j,n] (long) or buffer DCTs[j,n] (short).

Step 4—Transform each output channel j by performing a DCT on the accumulated tc's:

perform a long DCT 1041 and 1042 on buffers DCT[j] 1031 and 1032, respectively;

perform a short DCT 1043 and 1044 on buffers DCTs[j] 1033 and 1034, respectively;

accumulate 1051 and 1052 DCTs[j] back into DCT[j].

Step 5—Filter 1061 and 1062 each output channel j by performing known steps of windowing, overlapping and adding to generate PCM samples in PCM[j] 1071 and 1072.

Referring again to FIG. 2, BPU performs the decoding step and transfers the transform coefficients to AU 120. All six buffers are formed in AU RAM 121. AU 120 advantageously performs downmixing, transforming, and filtering while BPU 110 decodes the following frame of audio data.

Figure 15:
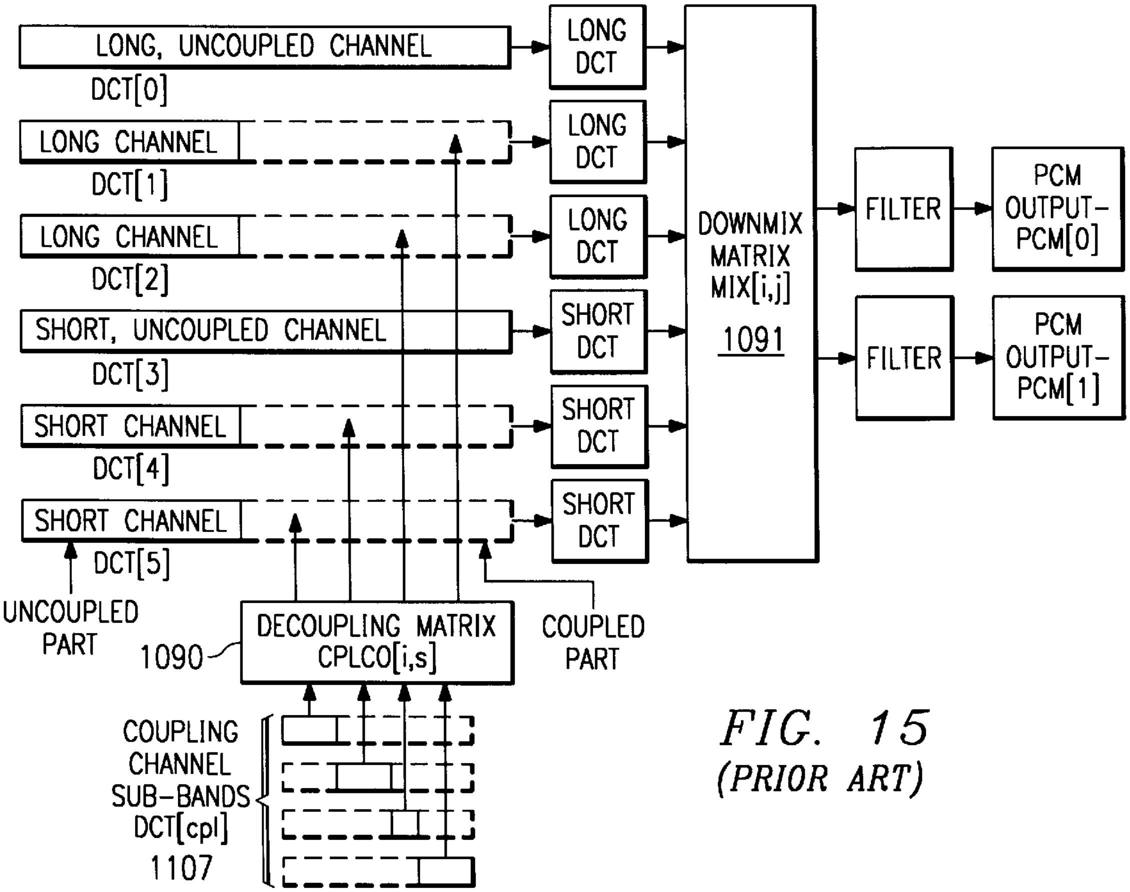
FIG. 15 (PRIOR ART)
FIG. 15 is a prior art flow chart illustrating how coupled channels are downmixed and transformed.

FIG. 15 is a prior art flow chart illustrating how coupled channels are downmixed and transformed. Coupling channel 1107 is a seventh audio channel which is artificially introduced by the AC-3 encoder to represent a signal which is common to one or more audio channels. When a coupling channel is present, any of the five main channels can be designated as either coupled or uncoupled. If coupled, then the high frequency transform coefficients are not transmitted for that channel. Instead, coupling coordinates are transmitted which indicate to the decoder how to recover those transform coefficients from the corresponding transform coefficients of the coupling channel.

Separate coupling coordinates are transmitted for each coupled channel. Further, the transform coefficients of the coupling channel are grouped into regions called coupling sub-bands, and a separate coupling coordinate is transmitted for each coupling sub-band. The coupling coordinates are stored in a matrix cplco[i,s] 1090, indexed by audio channel i and coupling sub-band s. To recover the coupled part of an audio channel from the coupling channel, the transform coefficients of the coupling channel are scaled by the coupling coordinate for the corresponding subband and audio channel. Decoding then proceeds as for the uncoupled case as described with reference to FIG. 10.

Figure 16:
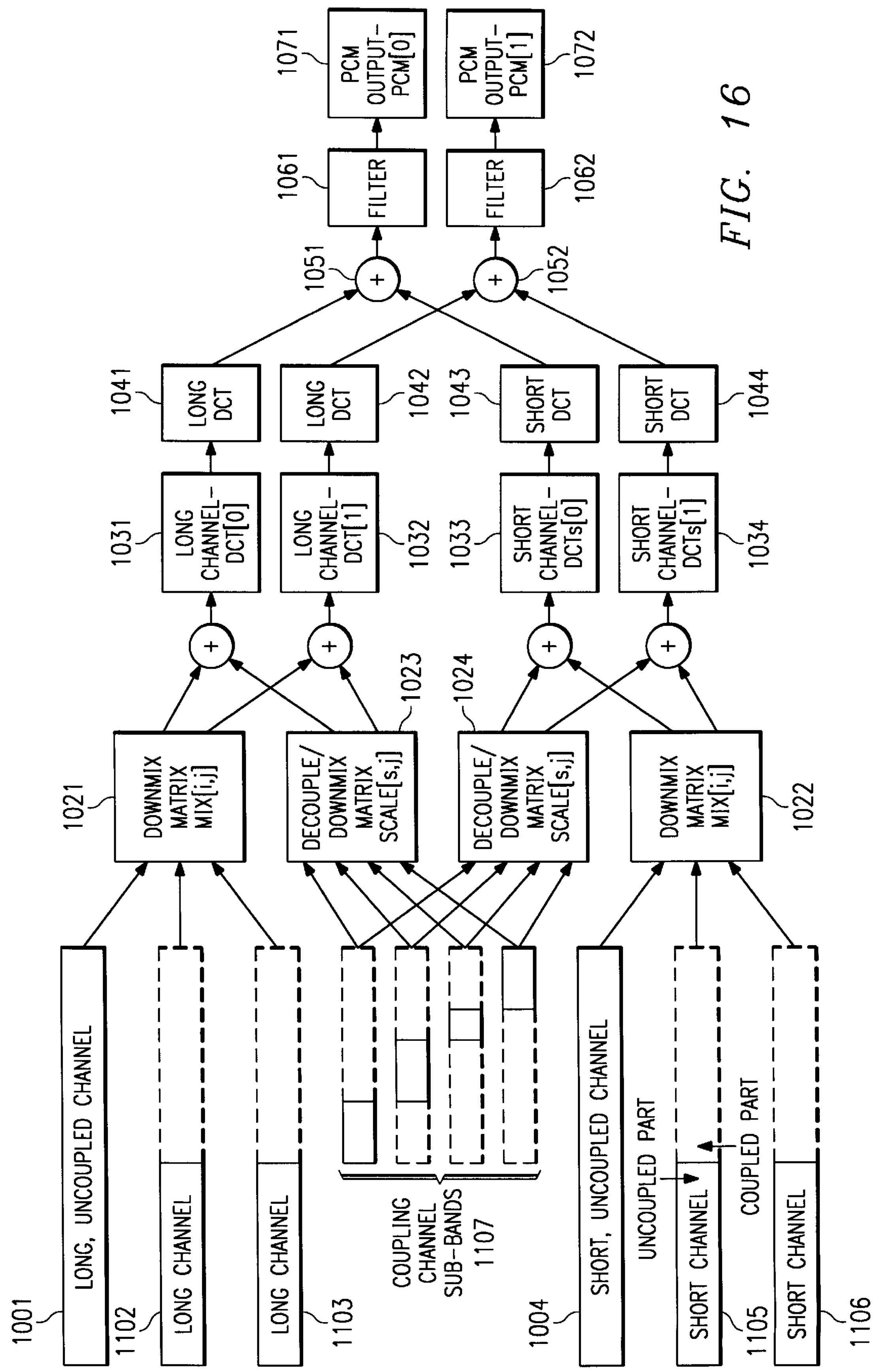
FIG. 16 is a flow chart illustrating how coupled channels are downmixed and transformed, according to an aspect of the present invention.

FIG. 16 is a flow chart illustrating how coupled channels are downmixed and transformed, according to an aspect of the present invention. The improved method with coupling, according to an aspect of the present invention, is an extension of the case without coupling, which was described with reference to FIGS. 11–14. For any uncoupled audio channels, the method is identical, and similarly for the uncoupled part of any coupled channel. The method differs only in the addition of a special downmixing operation for the coupling channel itself.

An embodiment of a downmixing operation according to the present invention for the coupling channel involves the following steps: the coupling channel is first expanded using a matrix of coupling coordinates cplco[i,s], similar to matrix 1090 (FIG. 15), into six channels; and then the six expanded channels are reduced using downmix matrices, similar to MIX[i,j] 1021 and 1022 (FIG. 14) into four channels (two long, two short).

Another aspect of the present invention is to combine the operations of decoupling and downmixing into a single operation, advantageously avoiding the complexity and additional storage associated with reconstructing the coupled part of any coupled audio channels in a first, separate stage. According to the present invention, the coupling coordinate matrix cplco[i,s] is multiplied by long downmix matrix 1021 to form a long scale matrix 1023. The coupling coordinate matrix is multiplied by short downmix matrix 1022 to form short scale matrix 1024. These matrices of "scale factors" advantageously allow the coupling channel to be downmiyed immediately into the DCT input buffers 1031–1034, without first reconstructing the coupled part of the audio channels.

Referring again to FIG. 1, fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual devices which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Data processing device 100 with two processing units 110 and 120 is well suited to perform the decode and transform operations according to aspects of the present invention in a parallel manner. Other embodiments include only a single data processing unit, or more highly parallel structures. For example, additional processing circuits can be allocated to perform one or more of the DCT steps. Processing circuits include digital signal processors, reduced instruction set processor, conventional CPU's, and the like. Multiple processing units such as AU 120, for example, can be disposed on one chip to advantageously improve performance.

An advantage of the present invention is that the number of times that a DCT or DCT transform needs to be performed is reduced. This advantageously reduces the computational requirements for transforming a stream of data representing encoded audio channels into one or more PCM data streams.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for processing a stream of data to form an output channel of PCM data, wherein the stream of data contains a plurality of virtual channels and each of the virtual channels is formatted into at least two types of data blocks, the method comprising:

separating the stream of data into a plurality of channels of frequency domain data which correspond to the plurality of virtual channels, wherein each channel of frequency domain data is segregated into a plurality of long and short blocks of frequency domain data;

specifying a coefficient for each of the plurality of channels, such that a sum of the coefficients is not greater than one;

mixing each of the plurality of frequency domain channels to form a downmixed frequency domain channel in proportion to the coefficients;

transforming the frequency domain channel into the output channel of PCM data;

wherein the step of mixing to form a downmixed frequency domain channel further comprises mixing only short blocks to form a short downmixed frequency domain channel and mixing only long blocks to form a long downmixed frequency domain channel; and wherein the step of transforming further comprises:

transforming the short downmixed frequency domain channel to form a short PCM data channel;

transforming the long downmixed frequency domain channel to form a long PCM data channel; and combining the short PCM data channel and the long PCM data channel to form the output channel of PCM data.

2. The method of claim 1, wherein the stream of data conforms to the Digital Audio Compression Standard (AC-3).

3. A method for processing a stream of data to form a left channel of PCM data and a right channel of PCM data, wherein the stream of data contains a plurality of virtual channels and each of the virtual channels is formatted into at least two types of data blocks, the method comprising:

separating the stream of data into a plurality of channels of frequency domain data which correspond to the plurality of virtual channels, wherein each channel of frequency domain data is segregated into a plurality of long and short blocks of frequency domain data;

specifying a left coefficient and a right coefficient for each of the plurality of channels, such that a sum of the left coefficients is not greater than one and such that a sum of the right coefficients is not greater than one;

mixing each of the plurality of frequency domain channels to form a left downmixed frequency domain channel in proportion to the left coefficients;

mixing each of the plurality of frequency domain channels to form a right downmixed frequency domain channel of data in proportion to the right coefficients;

transforming the left downmixed frequency domain channel and the right downmixed frequency domain channel into the left PCM data channel and into the right PCM data channel, respectively;

wherein the step of mixing to form a left downmixed frequency domain channel further comprises mixing only short left blocks to form a short left downmixed frequency domain channel and mixing only long left blocks to form a long left downmixed frequency domain channel; and wherein the step of transforming further comprises:

transforming the short left downmixed frequency domain channel to form a short left PCM data channel;

transforming the long left downmixed frequency domain channel to form a long left PCM data channel; and combining the short left PCM data channel and the long left PCM data channel to form the left channel of PCM data.

4. The method of claim 3, wherein:

the step of mixing to form a right downmixed frequency domain channel further comprises mixing only short right blocks to form a short right downmixed frequency domain channel and mixing only long right blocks to form a long right downmixed frequency domain channel; and the step of transforming further comprises:

transforming the short right downmixed frequency domain channel to form a short right PCM data channel;

transforming the long right downmixed frequency domain channel to form a long right PCM data channel; and adding the short right PCM data channel to the long right PCM data channel to form the right channel of PCM data.

5. The method of claim 4, wherein the stream of data conforms to the Digital Audio Compression Standard (AC-3).

6. The method of claim 4, further comprising:

forming a long scaling matrix and a short scaling matrix;

multiplying a coupling channel by the short scaling matrix to form a short left coupling block and a short right coupling block;

multiplying the coupling channel by the long scaling matrix to form a long left coupling block and a long right coupling block;

wherein the step of mixing further comprises mixing the short left coupling block with the other short left blocks, mixing short right coupling blocks with the other short right blocks, mixing long left blocks with the other long left blocks and mixing long right coupling blocks with the other long right blocks; and wherein the step of forming scaling matrices comprises:

forming a coupling coordinate matrix according to a coupling channel;

forming a long downmix matrix according to a set of coefficients;

forming a short downmix matrix according to the set of coefficients;

forming a long scaling matrix by multiplying the coupling coordinate matrix by the long downmix matrix; and forming a short scaling matrix by multiplying the coupling coordinate matrix by the short downmix matrix.

7. A data processing device, comprising:

a memory circuit for holding software routines;

a processing unit connected to the memory circuit and operable to execute the software routines;

an input buffer connected to the processing unit for receiving a stream of data;

an output buffer connected to the processing unit for outputting a channel of PCM data; and wherein the data processing device is programmed by the software routines to perform a method for processing a stream of data received in the input buffer to form channel of PCM data in the output buffer, wherein the stream of data contains a plurality of virtual channels and each of the virtual channels is formatted into at least two sizes of data blocks, the method comprising:

separating the stream of data into a plurality of channels of frequency domain data which correspond to the plurality of virtual channels, wherein each channel of frequency domain data is segregated into a plurality of long and short blocks of frequency domain data;

specifying a coefficient for each of the plurality of channels, such that a sum of the coefficients is not greater than one;

mixing each of the plurality of frequency domain channels to form a downmixed frequency domain channel in proportion to the coefficients;

transforming the frequency domain channel into the channel of PCM data; wherein the step of mixing to form a downmixed frequency domain channel further comprises mixing only short blocks to form a short downmixed frequency domain channel and mixing only long blocks to form a long downmixed frequency domain channel; and wherein the step of transforming further comprises:

transforming the short downmixed frequency domain channel to form a short PCM data channel;

transforming the long downmixed frequency domain channel to form a long PCM data channel; and adding the short PCM data channel to the long PCM data channel to form the channel of PCM data.

8. The method of claim 7, wherein the stream of data conforms to the Digital Audio Compression Standard (AC-3).

9. An audio reproduction system, comprising:

means for acquiring a stream of data which contains encoded audio data;

a data device for processing the stream of data connected to the means for acquiring, the data device operable to form a left channel of PCM data and a right channel of PCM data on a left and right device output terminals;

a separate digital to analog converter connected to each the output terminal operable to convert the channel of PCM data to an analog audio signal on a D/A output terminal;

a separate speaker subsystem connected to each the D/A output terminal; and wherein the data device includes a program for processing a stream of data to form an output channel of PCM data, wherein the stream of data contains a plurality of virtual channels and each of the virtual channels is formatted into at least two sizes of data blocks, the method comprising:

separating the stream of data into a plurality of channels of frequency domain data which correspond to the plurality of virtual channels, wherein each channel of frequency domain data is segregated into a plurality of long and short blocks of frequency domain data;

specifying a coefficient for each of the plurality of channels, such that a sum of the coefficients is not greater than one;

mixing each of the plurality of frequency domain channels to form a downmixed frequency domain channel in proportion to the coefficients; and transforming the frequency domain channel into the output channel of PCM data.

10. The audio reproduction system of claim 9, wherein the means for acquiring comprises a satellite broadcast receiver.

11. The audio reproduction system of claim 9, wherein the means for acquiring comprises a digital disk player.

12. The audio reproduction system of claim 9, wherein the means for acquiring comprises a cable TV receiver.

* * * * *